Oct. 28, 1930.   W. J. T. JUREY   1,780,017

FISHING TOOL

Filed June 19, 1929

INVENTOR.
William J. T. Jurey
BY
Charles Ed Cohn
ATTORNEY.

Patented Oct. 28, 1930

1,780,017

UNITED STATES PATENT OFFICE

WILLIAM J. T. JUREY, OF CLIFTON, KANSAS

FISHING TOOL

Application filed June 19, 1929. Serial No. 372,094.

My invention relates to improvements in a fishing tool.

The object of my invention is to provide a fishing tool for lost portions of a pumping mechanism in a water well.

A further object of my invention is to provide a fishing tool having a plurality of attaching means to the pipe upwardly extending from the cylinder of the pump when the pipe has become severed from the pump operating means at the surface or top of the well.

A still further object of my invention is to provide a fishing tool rotatably arranged and operable at the top of the well and connecting means for a hoist to withdraw the tool from the well.

A still further object of my invention is to provide a fishing tool being funnelled in form and having means on the lower end thereof to cause the article being fished for to enter the mouth when the tool is rotated.

A still further object of my invention is to provide a funnelled or bell mouthed fishing tool having a spirally formed member positioned so that the outer point thereof will circumscribe and be equal to or slightly greater in diameter than the diameter of the mouth of the tool, the member being capable of passing between a pipe and the casing of the well as the tool is rotated causing the pipe to enter the mouth of the tool as the said tool passes downward over the same. The tool has an automatic clutching means intermediately positioned to engage the pipe, should the threaded portion be severed therefrom and also a stem with a coupling thereon to threadedly engage on the end of the pipe when the threaded portion is in condition to threadedly engage as the tool rotates.

A still further object of my invention is to provide a fishing tool that is inexpensive and effective and simple in its operation.

These and other objects will hereinafter be more fully explained, reference being had to the accompanying drawings forming a part of this specification and in which similar characters will apply to similar parts in the different views.

Referring to the drawings.

Figure 1:
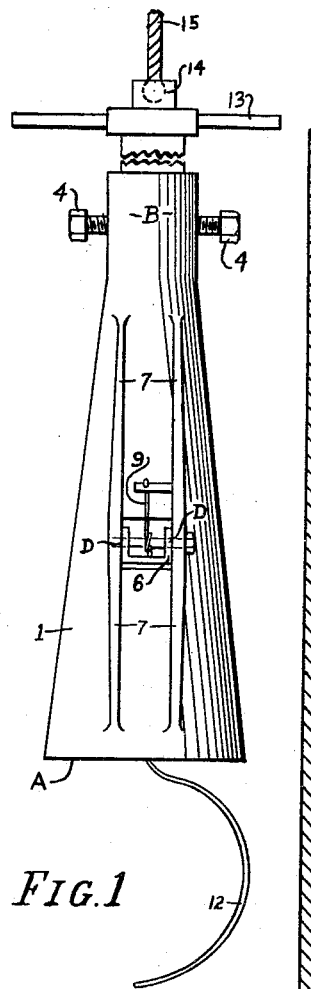
Fig. 1 is an elevation of the fishing tool as it appears when vertically positioned for operation.
Figure 2:
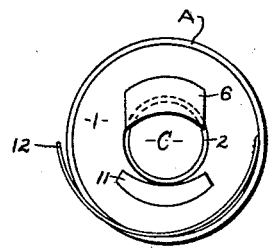
Fig. 2 is a plan view of the mouth of the tool.
Figure 3:
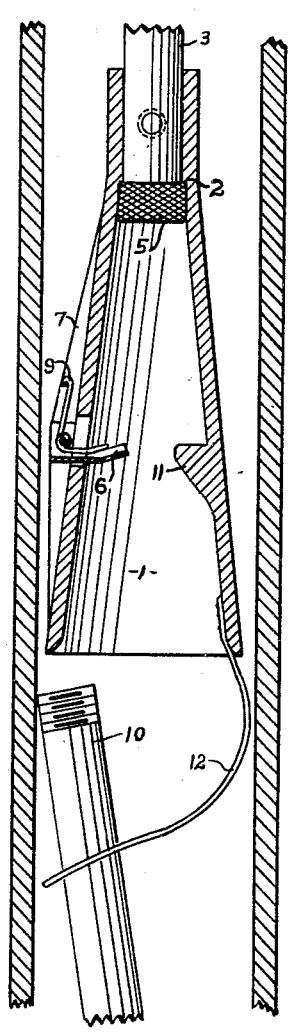
Fig. 3 is a longitudinal section of the fishing tool as positioned in the casing of the well. The said view also illustrates a possible position of a pipe angling toward and in contact with one side of the casing.
Figure 4:
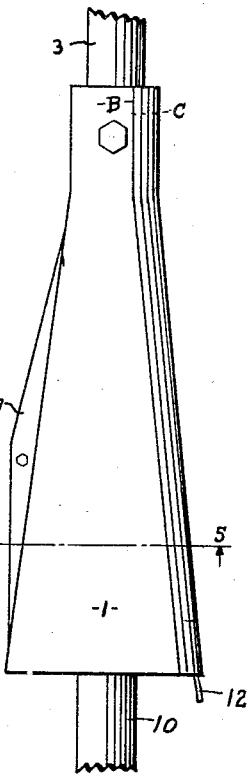
Fig. 4 is a side view of the fishing tool illustrating the position of the pipe as received by the tool.
Figure 5:
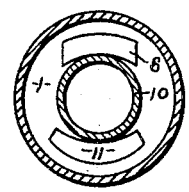
Fig. 5 is a cross section taken on the line 5—5 in Fig. 4.

My invention herein disclosed consists of a funnelled structure 1 bell mouthed at the bottom end as shown at A and having a neck portion at the other end as shown at B, the neck portion being apertured as at C and having an annular shoulder 2 spaced downward from the upper end thereof, all being integral. As a means to connect the tool to a stem 3 I have provided set screws 4 threadedly engaging through the neck portion, which also prevent the tool against rotation on the stem. Other means however may be employed for securing the tool to the stem, and a second means for securing is through the medium of a coupling 5 threadedly engaging on the stem, the upper end of which will seat rigidly against the annular shoulder 2. While I have shown a coupling of uniform diameter, the lower end thereof may be changed to agree with the diameter of a threaded end of a pipe or the upper threaded nipple of a valve cylinder, the valve cylinder not being shown in the drawings.

Intermediately positioned to the funnelled portion of the tool is a rockably arranged clutch member 6 pivotally engaging through the web members 7 as shown at D. The said clutch is tensioned to a right angle position with reference to the longitudinal axis of the tool through the medium of a spring 9 by which means the said clutch is supported in contact with the pipe 10 compressing the said pipe firmly in contact with an arcuated rib 11 oppositely positioned and extending toward the said clutch member. It is now readily seen how the clutch will rigidly engage the pipe when the tool is drawn upward. This method is preferable when the threaded upper end portion of the pipe has been removed by breakage or the thread of the pipe is stripped or otherwise marred to prevent engagement with the threaded coupling 5. When the threaded engagement method is resorted to as a connecting means the tool is rotated clockwise for such engagement and should the threads strip from either the coupling or the pipe the clutch member will instantly function as a supporting means for the pipe. Furthermore it is possible that the threaded connections and the clutch means will function simultaneously to withdraw the lost pipe from the well.

As a means to cause a pipe or a valve cylinder to enter the mouth of the tool without contacting the annular end thereof I have arranged a spirally wound member 12 downwardly extending from the mouth portion and being rigidly attached thereto so that the outer end portion thereof will engage snugly with the inside wall of the casing in such a way as to pass between the lost article such as the pipe or valve portion heretofore mentioned and guide the same concentrically into the mouth of the tool in its rotation.

As a means to operate, the stem 3, being attached to the tool, extends upward and has on its uppermost end a cross member 13 as turning means for the stem. I have also provided and positioned in axial alignment with the stem a swivelled link 14 to which a cable 15 may be attached. The said cable to be engaged by a hoisting mechanism which is not shown in the drawings.

It will be understood that in shallow wells the device may be operated exclusively by hand, that is to say the employment of a derrick will not be required as the tool and the parts fished for will be small and uncumbersome.

While I have disclosed my invention as a water well fishing tool I do not confine the same to this class of work alone as the tool may be proportioned for oil well service, functioning in a similar manner when fishing for a broken sucker rod or other tools that have been lost in the well and such modifications may be employed as lie within the scope of the appended claims.

Having fully described my invention what I claim as new and desire to secure by Letters Patent is:

1. In a fishing tool, a tool of the class described comprising a funnelled portion and an apertured neck portion having an annular shoulder therein, a rib member intermediately positioned in the funnel portion and extending inward and part way circumferentially, a clutch member oppositely positioned to the rib and pivotally connected to the funnel and extending toward the rib, the clutch adapted to rock upward toward the neck portion when contacting a pipe as it passes through the funnel, the clutch having a spring as tensioning means toward the rib, a spirally wound member attached to the mouth of the funnel and extending downward so that the outer portion thereof will position equal to or slightly greater than the diameter of the mouth of the funnel for the purpose specified, a stem positioned in the hollow of the neck and a coupling positioned on the stem for engagement with the threads of a pipe upon rotation of the stem and means to attach the funnel securely to the stem.

2. In a fishing tool of the class described in combination a stem, and a funnel structure detachably carried by the stem and rotatable therewith, a clutch element intermediately positioned within the funnel consisting of a segmental rib integrally connected to the funnel and a rockably arranged member as binding means for a pipe against retraction when passed between the rib and the rockably arranged member, a spirally formed member attached to the mouth of the funnel and extending downward therefrom as guiding means for a lost tool element in a well.

3. In a fishing tool for pipe, valve cylinders or drilling tool elements in a well, a hollow stem having a coupling threadedly engaging on the lower end thereof and a funnelled element having a hollow neck to receive the stem, the neck having an annular shoulder against which the coupling will engage as lifting means for the funnelled structure and set screws threadedly engaging diametrically in the neck as binding means against rotation of the stem therein, the threaded coupling adapted to engage with the threaded end of a lost article in a well as the funnelled structure is rotated and a clutch structure within the funnel coacting simultaneously with the threaded coupling as hoisting means for a lost article, a guiding element attached to the lower end of the funnel structure as means to convey the lost article into the lower end of the funnel, all as and for the purpose described.

In testimony whereof I affix my signature.

WILLIAM J. T. JUREY.